April 20, 1943.  A. C. RUGE  2,316,975

GAUGE

Original Filed Sept. 16, 1939

INVENTOR
ARTHUR C. RUGE
BY
ATTORNEY

Patented Apr. 20, 1943

2,316,975

UNITED STATES PATENT OFFICE 2,316,975

GAUGE

Arthur C. Ruge, Cambridge, Mass.

Original application September 16, 1939, Serial No. 295,207. Divided and this application March 11, 1942, Serial No. 434,178

8 Claims. (Cl. 33—143)

This invention relates generally to electrical strain sensitive gauges and more particularly to a gauge for measuring the distance or extent of movement between two points.

A great many different types of measuring gauges have heretofore been proposed and used of which the most elementary types are the ordinary inside and outside calipers or dividers while others include micrometers, dial indicators and many others of either mechanical, electrical or optical type. These various kinds of gauges all serve a purpose within their particular field or range of application, but none of them combine all of the qualities of simplicity, ease of application and ruggedness together with accuracy and sensitivity and the ability to be employed in awkward or relatively inaccessible locations that prevent direct reading of the gauge at the point of application.

It is an object of my invention to provide an improved electrical strain sensitive gauge that can be easily applied to a member so as to obtain a highly accurate reading of the distance between two points or of the extent of deformation or movement of a member.

A further object is to provide an improved electrical strain sensitive gauge having the foregoing desirable qualities and in which an electrical conducting material is used in such a manner that its electrical resistance is effectively varied in response to variation in the distance between two points or to movement or deformation of a member.

Other objects and advantages will be more apparent to those skilled in the art from the following description of the accompanying drawing in which.

Figure 1:
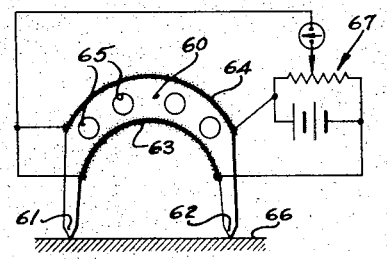
Fig. 1 is a side elevation of a bending strain gauge embodying my invention.

This application is a division of my copending application Serial No. 295,207, filed September 16, 1939, and I employ the principle broadly disclosed therein of bonding the entire effective length of an electrical strain sensitive filament to the surface of a member to be strained, this filament being of continuous solid material, preferably metallic, having its electrical resistance vary in accordance with strain developed within the filament. The filament may be of any suitable material, such as "Advance," "Nichrome," "Isoelastic" and other suitable materials whose change of resistance for a given strain is either well-known or can be readily determined. The filament is preferably of the approximate order of one to three thousandths of an inch in diameter and may be bonded to a variably strained surface by "Duco Household Cement," "Bakelite Cement" or other suitable bonding cements. The proportional change in electrical resistance in response to strain is herein referred to as "strain sensitivity." I employ the foregoing principles by providing my improved bending type strain gauge which, as shown in Fig. 1, comprises a flat U-shaped frame 60 having an arched intermediate portion terminating in spaced legs or ends with gauge points 61 and 62. This frame has sufficient thickness to permit a pair of strain filaments 63 and 64 to be cemented throughout its effective length to the inner concave and outer convex frame surfaces. The frame has a series of openings 65 to insure maximum flexibility in response to relative movement between the gauge points 61 and 62 upon occurrence of relative movement between the same which may be the result of strain in a specimen 66. The gauge points are held in contact with the surface of specimen 66 by any usual suitable clamps or rubber bands or simply by cementing the gauge points to the specimen if less precision measurements are desired. The strain filaments 63 and 64 are connected to a Wheatstone bridge generally indicated at 67.

In operation, the strains in the surface of specimen 66 are transmitted to gauge points 61 and 62 thereby causing the frame 60 to bend. This bending produces opposite tensile and compressive stresses in the filaments 63 and 64 whereby the relative strains of the two filaments can be determined by the Wheatstone bridge 67. In a bending gauge of this type the filament is preferably placed close to the bending surface purely as a matter of convenience, and also because it thereby is held closely to the temperature of the gauge body. Since all such gauges can be calibrated, the filament need not necessarily be placed close to the bending surface. As described in said copending application, the filament may be placed immediately adjacent a surface by cementing the filament directly thereon or by having the filament cemented to a thin paper carrying medium which in turn is cemented to the surface, such paper also serving as insulation in case the specimen is an electrical conductor.

Figure 2:
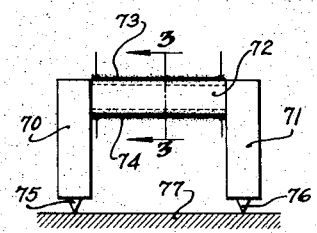
Fig. 2 is a side elevation of a modified form of gauge.
Figure 3:
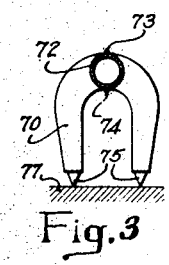
Fig. 3 is a transverse section taken on the line 3—3 of Fig. 2.

Another form of bending gauge is shown in Figs. 2 and 3 wherein the frame is composed of two permanent magnets 70 and 71 integrally attached in a suitable rigid manner to a thin walled tube 72. Cemented to the top and bottom of said tube are a pair of longitudinal strain filament wires 73 and 74 which are bonded throughout their effective lengths to said tube. The ends of these filaments are connected through suitable leads to a galvanometer bridge circuit such as 67, Fig. 1. The magnets 70 and 71 are each provided with pairs of gauge points 75 and 76 which are held in place on a specimen by magnetism when the specimen is of magnetizable material. The operation of this modification is otherwise identical to the modifications of Fig. 1. Movement of the pairs of gauge points 75 and 76 toward or away from each other in response to strain variations in the speciment 77 will cause the upper and lower strain filaments 73 and 74 to be subjected to tension and compression strains or vice versa. Measuring of the foregoing movement of the gauge points is in effect a measurement of the distance between two points inasmuch as the initial distance between said points can be predetermined to form a base from which the readings start.

If the frames of the bending gauges in Figs. 1 and 2 are of same material as the specimen, and if filaments are properly selected so as to exhibit the same changes in resistance due to temperature, then the gauges when cemented down similarly will read only strains created by stress in the specimen. Otherwise they will read differential expansion as well. The gauges can also withstand relatively great total strains in the specimen, thus making the gauges applicable for measurement of strains much larger than the filament wires themselves could sustain; they have no moving parts and due to their integral structure they exhibit no hysteresis effects; they are sufficiently flexible that very little force need be applied to hold them to the specimen surface under test and yet the gauges are sufficiently rugged that they can be handled without danger of injury to the structure or to their accuracy and sensitivity.

Where deflections or motions are to be measured as contrasted with measuring the strain in a material, the same principles as embodied for Figs. 1, 2 and 3 may be used. The deflection or motion is made to deform or bend a member to which a filament or filaments are applied in such a way that they undergo strains which are directly related to the deflection or motion to be measured. The advantage of this arrangement is that arbitrarily large or small deflections or motions can be made to produce arbitrarily large or small strains in the filament and this action is true whether the gauge employs a bending action as shown in Fig. 4 or whether a torsional or direct stress arrangement is used as a means of measuring the deflection or motion.

Figure 4:
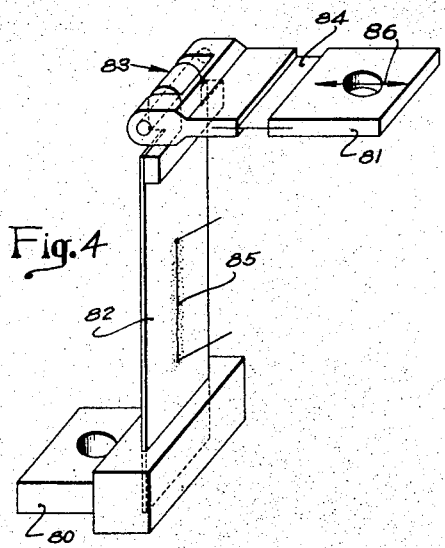
Fig. 4 is a perspective of a bending deflection gauge embodying my invention.

The principles of the above deflection or motion gauge are illustrated in Fig. 4 which is primarily adapted for measuring high speed displacements or motions of a small gun turret as a result of gun fire. Elements 80 and 81 are clamped at points between which motion or displacement takes place in the direction at, or approximately at, right angles to a metal cantilever 82 which is fixed rigidly to element 80 and connected to 81 by a swivel joint generally indicated at 83 and a thin flexible member 84. The thin flexible member 84 and joints 83 allow for any accidental misalignment of movement of the parts to which the elements 80 and 81 are clamped. Strain filaments such as 85 are placed in accordance with my invention preferably on the opposite sides of cantilever 82 lengthwise thereof. The two filaments are connected to a suitable Wheatstone bridge such as 67 of Fig. 1 thereby permitting relative motion between members 80 and 81 in the direction indicated by arrow 86 to be measured in terms of electrical resistance changes. I preferably use a strain gauge on each face of cantilever 82 for the purpose of obtaining double sensitivity and also for obtaining automatic temperature compensation, it being clear that movement of element 81 will cause the filaments on opposite sides of the cantilever to be subjected to compression and tension or vice versa. Another advantage is that any friction in swivel joint 83 has no effect upon the results. If the bending effect in cantilever 82 due to frictional forces at the swivel is calculated, then by calculation it can be determined where the filaments should be placed on the cantilever so that the measurements of the filament strain will not be influenced by such frictional forces.

Figure 5:
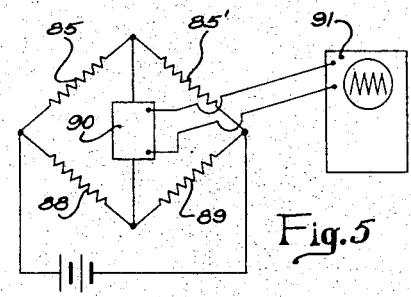
Fig. 5 is a diagrammatic illustration of an improved circuit particularly adapted for the gauge of Fig. 4.

A further advantage of the arrangement of Fig. 4 is that it has a very short natural period of vibration and hence the device is capable of measuring extremely fast movements between 80 and 81 without showing any measurable distortion due to its own dynamical properties. To measure and indicate such extremely fast movements it is preferable to employ a circuit as shown in Fig. 5. The strain filaments on opposite faces of cantilever 82 are indicated in Fig. 5 at 85 and 85', while fixed resistances 88 and 89 constitute the other arms of the Wheatstone bridge. When the resistance of filament 85 increases, the resistance of filament 85' decreases, and vice versa thus making the bridge twice as sensitive as though only one filament were used. An amplifier 90 of any suitable type is connected across the bridge while an oscillograph 91 enables the observer to see or record the motions in question. For slowly changing motions or for static calibration of the bending gauge a galvanometer may be substituted for the amplifier and oscillograph.

It will of course be understood that various changes in details of construction and arrangement of parts may be made by those skilled in the art without departing from the spirit of the invention as set forth in the appended claims.

I claim:

1. An electrical strain sensitive gauge comprising a frame having a flexible member and relatively movable specimen engaging portions whereby said flexible member is variably strained in accordance with said relative movement, and a continuous solid filament of electrical conducting material bonded throughout its effective length to said variably strained flexible member so as to follow fully the strains thereof and the electrical resistance of said filament varying in accordance with changes of strain therein, whereby changes in resistance of said filament is an indication of the extent of relative movement between said specimen engaging ends of said member.

2. An electrical strain sensitive gauge comprising a frame having a flexible member with relatively movable end portions, one side of said flexible member being variably strained in tension while the other side is simultaneously variably strained in compression, and a pair of filaments of conducting material respectively bonded throughout their effective length to said compression and tension sides of said flexible member so as to be oppositely strained fully in accordance with the strains of said member and the electrical resistances of said filaments varying in accordance with changes of strain therein, whereby said change of electrical resistance is an indication of the extent of relative movement between the ends of said flexible member.

3. An electrical strain sensitive gauge comprising a frame having spaced specimen engaging elements adapted to be relatively moved, said frame having a portion adapted to be variably strained in response to said relative movement, and a filament of conducting material bonded throughout its effective length to said variably strained frame portion so as to follow fully the strains thereof and the electrical resistance of said filament varying in accordance with changes of strain therein whereby the change in electrical resistance of said filament is an indication of the distance between said relatively movable specimen engaging elements.

4. An electrical strain sensitive gauge comprising a frame having spaced specimen engaging elements connected by an intermediate flexible portion whereby said specimen engaging elements are adapted to be relatively moved thereby to variably strain said flexible intermediate portion, and a filament of conducting material extending generally in the direction between said specimen engaging elements and the filament being bonded throughout its effective length to said intermediate portion so as to follow fully the strains thereof and the electrical resistance of said filament varying in accordance with changes of strain therein whereby the change in electrical resistance of said filament is an indication of the extent of relative movement between said specimen engaging elements.

5. The combination set forth in claim 4 further characterized in that said intermediate connecting portion is of arched formation.

6. The combination set forth in claim 4 further characterized in that said intermediate portion is of arched formation whereby the respective sides thereof are simultaneously subjected to tension and compression or vice versa and said filament is bonded to the outer arched side and another similar filament is bonded throughout its effective length to the inner arched side.

7. The combination set forth in claim 3 further characterized in that said specimen engaging elements have points adapted to be held in contact with a specimen so as to move in accordance with deformation thereof when a variable force is applied to the specimen.

8. The combination set forth in claim 3 further characterized in that said frame has magnetic portions adapted to hold the specimen engaging elements to a specimen of magnetizable material.

ARTHUR C. RUGE.